Nov. 16, 1954     T. A. FEENEY     2,694,536
STABLE POWER CONTROL FOR AIRCRAFT
Filed Nov. 19, 1951     2 Sheets-Sheet 1
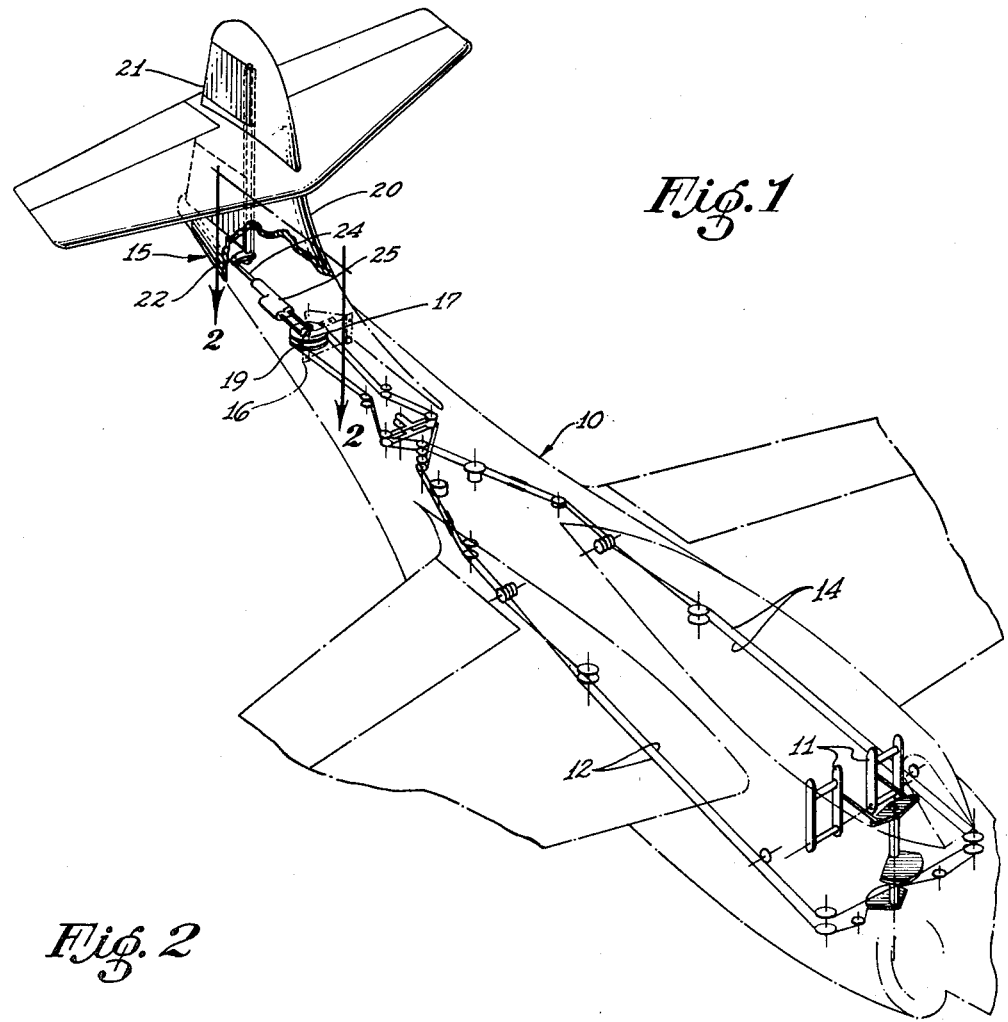
Fig. 1
Fig. 2
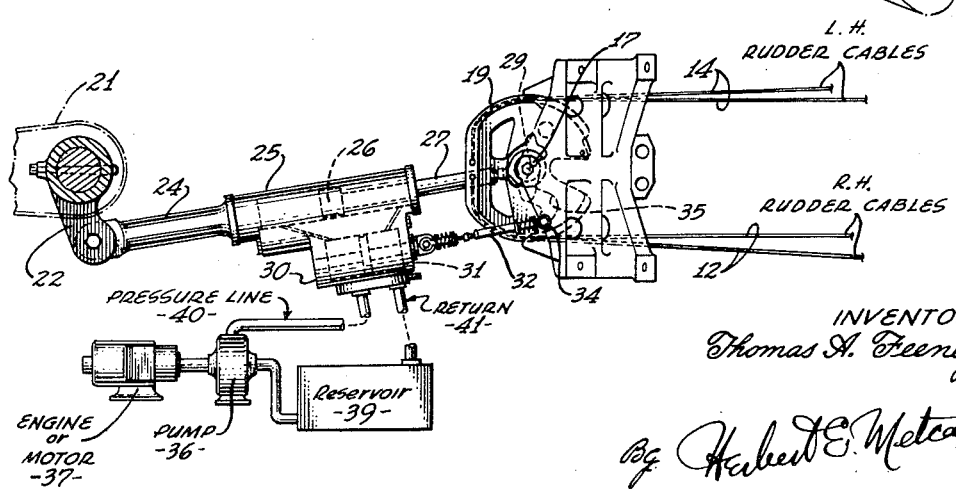
INVENTOR:
Thomas A. Feeney
By Herbert E. Metcalf
HIS PATENT ATTORNEY Nov. 16, 1954  T. A. FEENEY  2,694,536
STABLE POWER CONTROL FOR AIRCRAFT
Filed Nov. 19, 1951  2 Sheets-Sheet 2

INVENTOR:
Thomas A. Feeney
By Herbert E. Metcalf
HIS PATENT ATTORNEY

· # United States Patent Office 2,694,536
Patented Nov. 16, 1954

2,694,536

STABLE POWER CONTROL FOR AIRCRAFT

Thomas A. Feeney, Los Angeles, Calif., assignor to Northrop Aircraft, Inc., Hawthorne, Calif., a corporation of California Application November 19, 1951, Serial No. 257,099

16 Claims. (Cl. 244—85)

The present invention relates to hydraulically powered controls for airplanes, and is an improvement on the fully powered airplane control system shown, described, and claimed in my copending application Serial No. 23,-567, filed April 27, 1948, and now abandoned.

In the cited application, I disclosed an airplane control system in which a hydraulic cylinder was directly connected to move an airplane control surface, such as an elevon or rudder for example, the piston of the cylinder being connected to a fixed point on the airframe. Thus the cylinder moved with the surface. A valve housing was attached to the cylinder, having a valve moveable along a line parallel with the axis of the cylinder each way from a neutral position, to admit fluid to one side or the other of the piston to move the cylinder and the surface. The valve only, was connected to the pilot's control stick, or rudder pedals, as the case might be, so that the only force required to be exerted by the pilot was that necessary to overcome valve friction. No surface load feed-back to the pilot was present at any time.

I invented this original system primarily for use in the Northrop "Flying Wing" ®, a large and relatively stiff airplane.

In this airplane, the valve operating quadrant attachment was spaced from the piston rod attachment, but the airframe was sufficiently stiff and strong so that these two points could and did maintain their relative position at all times in flight.

Later this system was used on the high speed dual-jet F-89, U. S. A. F. fighter airplane, and when used for rudder control, the power assembly was mounted in the fuselage adjacent the vertical fin and rudder. In this position, the airframe in the vicinity of the power assembly is subject to flexure under normal system dynamic loads, which, if the attachment points of the cylinder piston and the valve actuating mechanism are not properly relatively positioned, could lead to unwanted valve movement (with consequent unwanted rudder movement and oscillation), due to the flexure of the airframe. This flexure, which can be referred to as a "secondary loop," has been found to contribute to the major portion of the unwanted valve motion, which when added to the initial valve motion tends to produce a destabilizing effect on the system as a whole.

It is an object of the present invention to provide a hydraulic power assembly for an airplane attitude control surface, which is not substantially affected by airframe flexure in the area in which the assembly is mounted.

It is another object of the invention to prevent unwanted valve movements in a fully powered hydraulic attitude surface control system for use in airplanes.

It is still another object of the invention to provide a fully powered hydraulic surface control assembly that can be mounted on portions of an airplane subject to flexure without causing unwanted control surface movements due to that flexure.

It is a still further object of the invention to provide a means for reducing the tendency for a fully powered airplane control surface to oscillate.

It is another object of the invention to provide, in a fully powered system for airplane surface control, a reverse feed-back for reduction of any tendency for the system to oscillate in operation.

Other objects and advantages will be made apparent later in this specification.

In brief, the present invention, in one form, utilizes a hydraulic cylinder having one end directly connected to operate a control surface of an airplane, and having a valve casing fixed thereto from which a valve operating rod extends substantially parallel to the axis of the cylinder. The cylinder has a coaxial piston therein having a piston rod extending through the other end of the cylinder and attached to a fixed attachment point on the airframe. A valve actuating quadrant is positioned to rotate around a shaft, for example, also having an attachment to a fixed point on the airframe, this quadrant being connected to move the valve operating rod, when the quadrant is rotated by the pilot of the airplane. Means are provided to interconnect the two attachment points so that any relative motion between the piston attachment point and the cylinder, will move the piston and also the valve in a direction to reduce any tendency to oscillation as might occur if the quadrant attachment point were spaced from the piston attachment point and the airframe between the points subject to flexure, either due to surface actuating loads on the piston rod attachment, or to any other load operating at the attachment area, i. e. system dynamic loads.

My invention will be more fully understood by reference to the ensuing description of the drawings in which:

Figure 1 is a perspective diagram showing the present invention in one preferred form, as used in the U. S. A. F. F-89 night fighter, for rudder control.

Figure 2 is a top plan view of a unit shown in Figure 1, with the hydraulic circuit shown diagrammatically.

Figure 3:
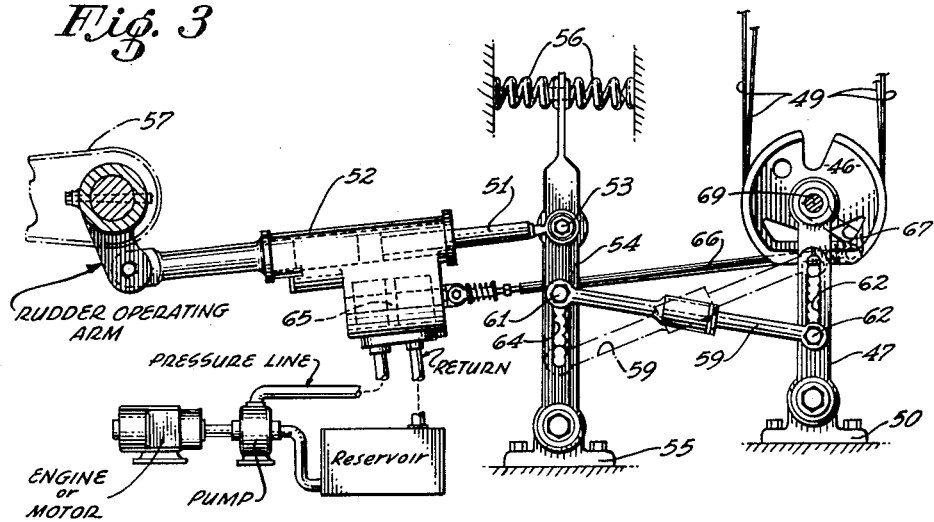
Figure 3 is a top plan view of a modification of my invention.

Referring first to Figure 1, the airplane 10 is provided, in the pilot's cockpit, with the usual rudder pedals 11, these pedals operating right hand rudder cables 12 and left hand rudder cables 14 in the usual manner, the cables being double for safety. Adjacent the tail structure 15 in the narrowed fuselage, a heavy quadrant bracket 16 is mounted on the airframe of the airplane 10 this bracket 16 supporting a vertical shaft 17.

A cable quadrant 19 is mounted to rotate horizontally on vertical shaft 17 and left hand cables 14 pass around one side of quadrant 19 with right hand cables 12 passing around the other side of quadrant 19, these cables then being fixed at the rear of the quadrant. This motion of the rudder pedals will rotate quadrant in the usual manner. The fuselage of the airplane 10 just above bracket 16 supports a vertical fin 20, to which a vertical rudder 21 is hinged, the base of this rudder having a laterally extending rudder operating arm 22, and attached thereto is a cylinder rod 24 which is axially and directly attached to one end of a hydraulic cylinder 25 with the cylinder rod 24 normally at close to a right angle to arm 22 with the rod 24 and cylinder 25 extending generally forward as is more clearly shown in Figure 2, a piston 26, shown in dotted lines inside of cylinder 25, is provided with a coaxial piston rod 27 extending through the other end of cylinder 25, this rod 27 having an end bearing 29 surrounding and pivoted on the quadrant shaft 17.

Cylinder 25 has attached thereto, and on one side thereof, a valve casing 30 in which a valve 31, shown in dotted lines, is moveable along a line parallel to the axis of the cylinder 25. A valve actuating rod 32 extends outwardly generally parallel to piston rod 27, and is attached to a quadrant pin 34 on a quadrant arm 35 attached to quadrant 19. Rotation of quadrant 19 by the pilot via the rudder cables 12 and 14, moves the valve 31 either way from a neutral position to admit fluid under pressure to one side or the other of piston 26.

In an airplane, the power is provided by a pump 36 driven from the engine or motor 37, the fluid being taken from reservoir 39 and sent to valve casing 30 through pressure line 40, and the fluid returning through return line 41 to the reservoir. The system is preferably a constant pressure system, using a pressure of 3000 lbs. per sq. in., for example, with a neutral leakage through the valve 30 to place a balanced load of about 1500 lbs. per sq. in. on both sides of the piston 26 to provide for gust stabilization.

In a system of the type described, system dynamic loads on the rudder 21 can be high, sufficiently high so that as power is applied (or released) from the rudder 21, shaft 17 attached to the airframe will move slightly, due to the fact that it is not practical to stabilize shaft 17 completely with respect to rudder 21 and attached cylinder 25. It has been found that when the shaft 17, for example, is used only for the attachment point for transmitting the air loads into the fuselage and where the valve 30 is operated from a quadrant attached to some different point, there can be sufficient relative movement of cylinder 25 and valve 30 to cause unwanted movement and even oscillation of the rudder 21, in the absence of coordination of piston attachment and valve operating attachment.

This coordination is attained in the system of Figure 2 by making the piston rod attachment point the same as the valve operating quadrant attachment; i. e., attaching both to shaft 17. Thus when shaft 17 is moved, due to reaction between cylinder 25 and piston 26, the valve 30 is correspondingly moved so that the tendency toward oscillation is greatly reduced.

In case it is not practical to use a single attachment point for rod 27 and valve actuating rod 32, or when it may appear desirable to have a reverse feed-back ratio different from one to one, the system of Figure 3 can be used.

Here, cable quadrant 46 is mounted to rotate on the end of a quadrant support lever 47, being actuated as before by rudder cables 49, which take off from quadrant 46 in the same plane thereas, but generally at right angles to the direction of movement of the actuating valve and cylinder so that tension changes on cables 49 due to movement of arm 47 is virtually eliminated. Quadrant support lever 47 is mounted on a bracket 50 attached to the fuselage, so that quadrant support lever 47 can swing in the plane of the cable quadrant 46.

Piston rod 51 in hydraulic cylinder 52 in this case, is attached to a piston rod attachment pin 53 on piston rod support lever 54, this lever 54 also being attached to the airframe by rod lever bracket 55 to swing in a plane parallel to that of quadrant lever 47.

Rod lever 54 is partially stabilized at its outer end by opposed, heavy springs 56, these springs being related in power to the air loads on rudder 57, so that only a small amount of movement, not usually over ⅛ inch, for example, takes place at the piston rod attachment pin 53, as the system is operated.

A feed-back link 59 is then provided between quadrant support lever 47 and piston rod support lever 54, the ends of this link 59 being connected to end pins 60 and 61 respectively, and passing through respective lever slots 62 and 64. Link 59 is also made adjustable in length.

At the neutral position of the rudder 57 and the piston support lever 54, the valve 65 is connected through its operating rod 66 to quadrant arm 67 attached to quadrant 46 as before, so that valve 65 is in neutral position. Thereafter, movement of piston rod support lever 54, under load conditions, also moves valve operating quadrant 46 and valve 65. This movement can be made, by adjustment of link 59 position, as may be needed to prevent rudder oscillation. The system of Figure 3 is also useful when piston rod pin 53 and quadrant shaft 69 have to be spaced apart due to requirements of basic airplane design.

The results, in both cases are identical, i. e., that the valve is relatively moved, by any motion of the piston rod support lever, with this movement in a direction to reduce any tendency toward rudder oscillation.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. In a hydraulically powered surface control system in an airplane, a surface to be moved and pivoted on the frame of said airplane for control thereof, a hydraulic cylinder connected at one end thereof to move with said surface, a hydraulic piston in said cylinder and having a coaxial piston rod extending through the other end of said cylinder, a shaft attached to the frame of said airplane, said piston rod being anchored on said shaft, a valve housing mounted on and movable with said cylinder, a valve mounted in said valve housing and movable therein to control and direct a supply of operating fluid into and out of appropriate sides of said piston in said cylinder to operate said surface, a lever member coaxially mounted to rotate on said shaft, pilot control means for rotating said lever member, and an operating rod connecting said valve to said lever member to operate said valve in accordance with rotation of said lever member.

2. In a hydraulically powered surface control system in an airplane, a surface to be moved and pivoted on the frame of said airplane for control thereof, a hydraulic cylinder connected at one end thereof to move with said surface, a piston in said cylinder and having a coaxial piston rod extending through the other end of said cylinder, a shaft mounted to the frame of said airplane, said piston rod being pivotally connected to said shaft with the axis of said piston rod intersecting the axis of said shaft, a valve housing mounted on and moving with said cylinder, a valve mounted in said valve housing and movable therein to control and direct a supply of operating fluid into and out of appropriate sides of said piston to move and pivot said surface, a control lever coaxially to rotate on said shaft, pilot operable means for rotating said control lever, and an operating rod connecting said valve with said control lever for operation of said valve in accordance with rotation of said control lever.

3. In a hydraulically powered surface control system in an airplane, a surface to be moved and pivoted on the frame of said airplane for control thereof, a hydraulic cylinder connected at one end thereof to move with said surface, a hydraulic piston in said cylinder and having a coaxial piston rod extending through the other end of said cylinder, a shaft fixedly mounted to the frame of said airplane, the extended end of said piston being pivotally connected to said shaft with the axis thereof intersecting the axis of said shaft, a valve housing mounted on and movable with said cylinder, a valve mounted in said housing and movable along a path parallel to the axis of said cylinder to control and direct a supply of operating fluid into and out of appropriate sides of said piston to move and pivot said surface, a control quadrant coaxially mounted to rotate on said shaft, pilot operable means connected to rotate said quadrant, and an operating rod connecting said valve with said quadrant to move said valve in accordance with said quadrant rotation by said pilot operable means.

4. In a hydraulically powered surface control system in an airplane, a surface to be moved and pivoted on the frame of said airplane, a hydraulic cylinder connected at one end thereof to move with said surface, a piston in said cylinder and having a coaxial piston rod extending through the other end of said cylinder, a shaft fixedly mounted to the frame of said airplane, said piston rod being pivotally connected to said shaft with the axis thereof intersecting the axis of said shaft at substantially a right angle thereto, a valve housing mounted on and movable with said cylinder, a valve mounted in said valve housing and movable along an axis parallel with the axis of said cylinder to control and direct a supply of operating fluid into and out of appropriate sides of said hydraulic piston in said cylinder to move and pivot said surface, a control quadrant coaxially mounted to rotate on said shaft, pilot control means for rotating said quadrant, a valve operating rod attached to said valve and extending therefrom toward said quadrant, and a connection associated with said quadrant for attachment to said valve operating rod, said connection being pivotally attached adjacent the edge of said quadrant and spaced a given distance from the center thereof to extend at substantially a right angle to the longitudinal axis of said valve operating rod when said valve is in a neutral position in said valve housing, said valve operating rod being movable in accordance with rotation of said quadrant to operate said valve to move and pivot said surface for control of said airplane.

5. In an airplane; a stable power control system comprising a pilot's control element, a control surface to be moved and pivoted on the frame of said airplane for attitude control, an operating lever attached to said surface, an extendible member attached at one end thereof to a first support lever movably mounted on the frame of said airplane, the other end of said extendible member being connected to said surface operating lever, said extendible member being variable in length to move and pivot said surface for control of said airplane, a motor connected to vary the length of said extendible member when energized, control means having two components thereof relatively movable in either direction from a neutral position to vary the length of said extendible member for movement of said surface in a direction corresponding to the direction of movement of said components, one of said components being connected to move with said surface, a control means actuator connected for operation by said pilot's control element, a second support lever movably mounted on the frame of said airplane, said actuator coaxially mounted with said pilot's control element to rotate on said second support lever, the other component of said motor control means being connected to be moved in accordance with rotation of said actuator, and a rigid linkage connected between the movable support lever on which said actuator is mounted and the movable support lever to which one end of said extendible member is connected to correspondingly move said support levers together in the same direction.

6. Apparatus in accordance with claim 5 wherein said support levers are aligned to move on a parallel axis.

7. Apparatus in accordance with claim 5 wherein said extendible member is coaxially mounted at one end thereof to pivot on a shaft which is fixedly mounted to the frame of said airplane, and wherein said motor control means actuator is a control quadrant coaxially mounted to rotate about on a common axis with said extendible member.

8. Apparatus in accordance with claim 5 wherein said support lever for said extendible member is movably connected to the frame of said airplane at one end thereof, and wherein elastic means is connected at the other end thereof to restrict movement of said support to a predetermined amount in either direction in accordance with relative movement of said surface under load conditions, and wherein said support lever for said motor control means actuator is also movably connected to the frame of said airplane, and wherein said linkage is adjustable to a dimension to provide a one to one ratio of relative movement between said supports.

9. Apparatus in accordance with claim 5 wherein said support lever for said extendible member is movably connected at one end to the frame of said airplane with elastic means connected at the other end to restrict movement thereof to a predetermined amount in either direction in accordance with relative movement of said surface under load conditions, said support lever for said motor control means being also movably connected to the frame of said airplane, and wherein a ratio changer is integrally associated with said linkage to adjust the length thereof.

10. Apparatus in accordance with claim 5 wherein said support lever for said extendible member is movably connected to the frame of said airplane, with elastic means being connected to restrict the range of movement of said support in either direction in accordance with relative movement of said surface under load conditions, and wherein said support lever for said quadrant is also movably connected to the frame of said airplane, and wherein means are provided in said linkage to adjust the ratio of relative movement of said support levers, and wherein said linkage is adjustable to a dimension providing a ratio of relative movement different than one to one.

11. Apparatus in accordance with claim 5 wherein said support lever for said extendible rod is movably connected to the frame of said airplane with elastic means connected thereto for restraining the movement of said support within a predetermined range of movement in either direction from a neutral position in accordance with flexure of the frame of said airplane under system dynamic loads, and wherein said support lever for said control quadrant is also movably connected to the frame of said airplane, said extendible rod support and said control quadrant support being interconnected for relative movement by a rigid linkage, said linkage being adjustable to provide a desired ratio of relative movement between said support levers, and wherein said linkage is adjustable to a dimension providing a ratio of said desired relative movement different than one to one.

12. Apparatus in accordance with claim 5 comprising: elastic means connected with said first support lever for restraining the movement thereof within a predetermined range of movement in either direction from a neutral position in accordance with relative movement of said surface under air loads imposed thereon, and wherein said rigid linkage connecting said first and second support levers is adjustably connected to said support levers.

13. In an airplane; a stable power control system comprising a pilot's control element, a control surface to be moved and pivoted on the frame of said airplane for control thereof, a hydraulic actuating cylinder connected at one end thereof to move with and pivot said control surface, a piston in said cylinder and having an operating rod extending through the other end of said cylinder, a quadrant shaft fixedly mounted to the frame of said airplane, the extended end of said piston operating rod being pivotally connected to said quadrant shaft, a control valve housing integrally mounted on said actuating cylinder and having fluid passages therein communicating with the interior of said cylinder on either side of said piston, a valve mounted in said valve housing and movable therein to control and direct the flow of a supply of operating fluid through said passages to appropriate sides of said cylinder piston for operation of said cylinder, a control quadrant coaxially mounted to pivot on said quadrant shaft, quadrant operating means connected between said control quadrant and said pilot's control element to pivot said quadrant in accordance with movement of said pilot's control element, a quadrant lever mounted on said quadrant shaft and associated with said quadrant for movement therewith in accordance with movement of said pilot's control element, and a valve operating rod connected at one end thereof to said quadrant lever, the other end of said valve operating rod being connected to said valve for movement thereof, whereby any movement of said quadrant shaft due to flexure of the frame of said airplane in the region of said control system will relatively move said quadrant lever and connected valve and therefore said cylinder by the same amount therewith.

14. In a hydraulically powered surface control system in an airplane, a control surface mounted to be moved and pivoted on the frame of said airplane for attitude control thereof, a hydraulic cylinder connected at one end thereof to move and pivot said control surface and being relatively movable therewith, a coaxial piston in said cylinder and having a piston rod extending through the other end of said cylinder and anchored on a stationary shaft vertically mounted on the frame of said airplane, a valve housing mounted on and movable with said cylinder, a valve mounted in said valve housing and movable therein to control a supply of operating fluid into and out of appropriate sides of said piston in said cylinder for actuation thereof to move and pivot said control surface, a valve actuating quadrant pivotally mounted on said vertical shaft, a valve operating rod movable along a line parallel with the line of movement of said piston rod and connecting said valve to said quadrant, a pilot's control element, control means connecting said pilot's control element to said quadrant for pivotal movement thereof to actuate said valve, whereby movement of said airplane frame due to flexure thereof and thereby said vertical shaft will correspondingly move said piston rod and said valve actuating rod by the same amount to reduce any tendency toward oscillation in said control system which may occur in said control system due to said airplane frame flexure.

15. In an airplane; a stable power control system comprising a pilot's control element, a control surface mounted to be pivoted on the frame of said airplane, an operating arm attached to said surface, a hydraulic cylinder connected at one end thereof to said operating arm, an operating piston mounted in said cylinder and having a piston rod extending through the other end of said cylinder, a first support lever pivotally mounted to the frame of said airplane and extending transversely to the axis of said piston rod, said piston rod being pivotally connected at the free end thereof to said support lever intermediate its ends, the free end of said support lever being interposed between a pair of coaxially aligned springs preloaded to restrict movement of said support lever to a pre-specified range, a valve housing mounted on and movable with said cylinder, a valve mounted in said valve housing and movable along a line parallel with the line of movement of said piston rod to control the flow of operating fluid into and out of said cylinder on appropriate sides of said piston, a cable control quadrant, a second support lever pivotally mounted to the frame of said airplane, said quadrant being rotatably mounted adjacent the free end of said second support lever with the quadrant axis substantially intercepting the axis of said piston rod, a quadrant arm associated with said quadrant and movable in accordance with rotation thereof, control means extending at substantially a right angle to the axis of said cylinder and piston rod and connecting said pilot's control element with said quadrant for rotation thereof, a valve actuating rod connected at one end thereof to said quadrant arm, the other end of said valve actuating rod being connected to move said valve in accordance with quadrant rotation, a link pin-connected at one end thereof to said first support lever intermediate the ends thereof, the other end of said link being pin-connected to said second support lever intermediate the ends thereof, and means for changing the length of said link, whereby movement of either of said first and second support levers will be equally and relatively transmitted to the other control surface connections to reduce any tendency toward oscillation therein due to flexure of said airplane frame.

16. In an airplane; a stabilized power control system comprising a control surface pivotally mounted to the frame of said airplane, a double acting hydraulic actuator connected at one end thereof to operate said control surface, a control quadrant mounted to pivot on the frame of said airplane, a pilot's control element connected to pivot said quadrant, a control valve mounted on and movable with said hydraulic actuator, a valve operating rod extending from said control valve and connected to be reciprocated by said control quadrant for operation of said valve, the other end of said hydraulic actuator being associated with said control quadrant in a manner that any movement of said quadrant other than pivoting will relatively move said actuator, said valve control rod also being relatively moved with said other quadrant movement so that said control valve is actuated when said actuator is moved.

References Cited in the file of this patent

UNITED STATES PATENTS

| Number | Name | Date |
|---|---|---|
| 2,581,250 | Garside | Jan. 1, 1952 |
| 2,640,466 | Feeney | June 2, 1953 |